US011339001B2

(12) United States Patent
Suemichi et al.

(10) Patent No.: US 11,339,001 B2
(45) Date of Patent: May 24, 2022

(54) COMBINATION WEIGHING APPARATUS

(71) Applicant: Yamato Scale Co., Ltd., Hyogo (JP)

(72) Inventors: Ryo Suemichi, Hyogo (JP); Naho Uno, Hyogo (JP)

(73) Assignee: Yamato Scale Co., Ltd., Hyogo (JP)

( * ) Notice: Subject to any disclaimer, the term of this patent is extended or adjusted under 35 U.S.C. 154(b) by 0 days.

(21) Appl. No.: 17/286,234

(22) PCT Filed: Dec. 13, 2019

(86) PCT No.: PCT/JP2019/048986
§ 371 (c)(1),
(2) Date: Apr. 16, 2021

(87) PCT Pub. No.: WO2020/129852
PCT Pub. Date: Jun. 25, 2020

(65) Prior Publication Data
US 2021/0347572 A1    Nov. 11, 2021

(30) Foreign Application Priority Data

Dec. 19, 2018  (JP) .............................. JP2018-237044

(51) Int. Cl.
*B65G 11/20*   (2006.01)
*B65G 11/08*   (2006.01)
*B65G 65/40*   (2006.01)
*G01G 19/387*  (2006.01)

(52) U.S. Cl.
CPC ............. *B65G 11/20* (2013.01); *B65G 11/08* (2013.01); *B65G 65/40* (2013.01); *G01G 19/387* (2013.01); *B65G 2203/0258* (2013.01)

(58) Field of Classification Search
CPC ..... G01G 19/387; G01G 19/393; G01G 13/16
USPC ....................................................... 177/25.18
See application file for complete search history.

(56) References Cited

U.S. PATENT DOCUMENTS

| 3,990,586 | A | * | 11/1976 | Wyard | ............... B65G 47/8815 198/530 |
| 4,026,425 | A | * | 5/1977 | Gruodis | ................. B65G 47/44 198/359 |
| 4,040,530 | A | * | 8/1977 | Mahr | ........................ C21B 7/20 193/2 R |
| 4,042,130 | A | * | 8/1977 | Legille | ..................... F27B 1/20 414/199 |
| 4,344,519 | A | * | 8/1982 | Murray | ................ B65G 11/206 193/31 R |
| 4,372,730 | A | * | 2/1983 | Ladt | ...................... B65G 67/06 222/536 |

(Continued)

FOREIGN PATENT DOCUMENTS

| CN | 107209047 A | 9/2017 |
| EP | 1347276 A2 | 9/2003 |

(Continued)

*Primary Examiner* — Joseph A Dillon, Jr.
(74) *Attorney, Agent, or Firm* — Norris McLaughlin, P.A.

(57) ABSTRACT

A combination weighing apparatus includes a retaining hopper that retains an article and supplies the retained article onto a transport path. The retaining hopper has a coupling portion adapted to be inserted in along the support rails and pulled off from support rails disposed in a pair. The retaining hopper is thus supportable by the support rails and is readily mounted to and dismounted from the apparatus without using any tool for cleaning and other purposes.

7 Claims, 15 Drawing Sheets

(56) References Cited

U.S. PATENT DOCUMENTS

| | | | | |
|---|---|---|---|---|
| 4,398,614 A * | 8/1983 | Kakita | G01G 19/32 | 177/25.18 |
| 4,531,881 A * | 7/1985 | Stempniak | B65F 3/02 | 414/346 |
| 4,548,287 A * | 10/1985 | Matsuura | G01G 13/026 | 177/128 |
| 4,844,235 A * | 7/1989 | Sherman | B65G 27/04 | 209/147 |
| 5,054,652 A * | 10/1991 | Oshima | G01G 13/024 | 222/77 |
| 5,646,374 A * | 7/1997 | Stapp | G01G 19/393 | 198/771 |
| 5,753,867 A * | 5/1998 | Konishi | G01G 19/393 | 177/25.18 |
| 6,365,845 B1 * | 4/2002 | Pearce | G01G 21/28 | 177/180 |
| 6,806,429 B2 * | 10/2004 | Carlson | G01G 13/024 | 177/60 |
| 7,019,224 B2 * | 3/2006 | Kawanishi | G01G 13/022 | 222/77 |
| 7,790,990 B2 * | 9/2010 | Kieselhorst | G01G 19/393 | 177/25.18 |
| 7,937,906 B2 * | 5/2011 | Schmidhuber | G01G 13/16 | 222/77 |
| 10,156,471 B2 * | 12/2018 | Nagai | B65B 1/32 | |
| 10,557,747 B2 * | 2/2020 | Kishikawa | G01G 19/393 | |
| 10,986,847 B2 * | 4/2021 | Hansen | B65G 27/08 | |
| 11,247,855 B2 * | 2/2022 | Kishikawa | G01G 13/18 | |
| 11,261,033 B2 * | 3/2022 | Nagai | G01G 19/393 | |
| 2005/0126893 A1 * | 6/2005 | Berger | B65G 27/32 | 198/763 |
| 2010/0108405 A1 * | 5/2010 | Kieselhorst | G01G 19/393 | 177/25.18 |
| 2016/0362241 A1 * | 12/2016 | Morimoto | G01G 13/003 | |
| 2016/0370222 A1 * | 12/2016 | Morimoto | G01G 21/30 | |
| 2021/0354930 A1 * | 11/2021 | Suemichi | B65G 27/16 | |
| 2021/0372848 A1 * | 12/2021 | Suemichi | G01G 19/387 | |
| 2021/0381878 A1 * | 12/2021 | Yokoyama | G01G 19/393 | |
| 2021/0381879 A1 * | 12/2021 | Yokoyama | G01G 19/393 | |
| 2021/0389169 A1 * | 12/2021 | Suemichi | G01G 19/393 | |
| 2021/0389170 A1 * | 12/2021 | Yamada | G01G 19/393 | |

FOREIGN PATENT DOCUMENTS

| | | |
|---|---|---|
| JP | 62-140418 U1 | 9/1987 |
| JP | 2-106522 A | 4/1990 |
| JP | 9-257554 A | 10/1997 |
| JP | 2009-92399 A | 4/2009 |
| JP | 2018-077074 A | 5/2018 |

* cited by examiner

Front-back direction

Front-back direction

Lateral direction

Lateral direction

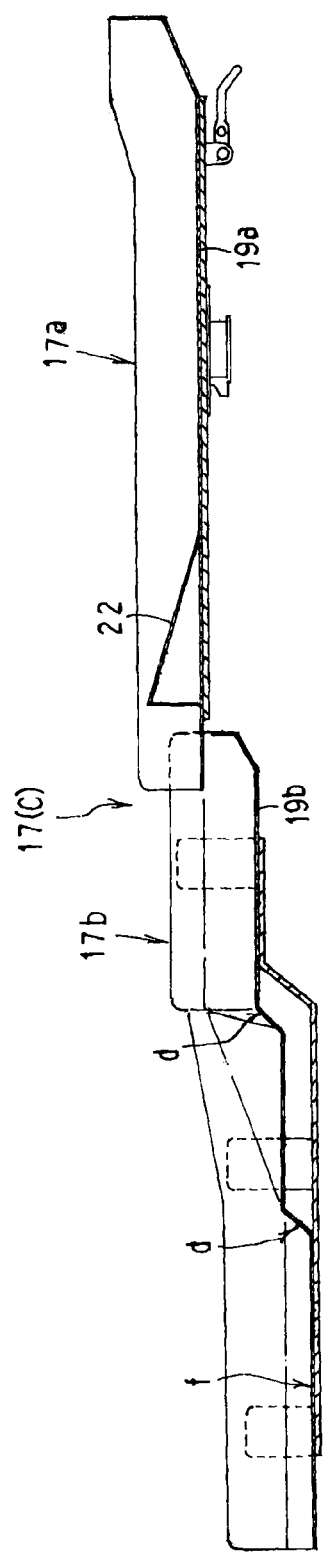

COMBINATION WEIGHING APPARATUS

TECHNICAL FIELD

The present invention relates to a combination weighing apparatus for use in mixing and weighing predetermined quantities of different kinds of articles, for example, foodstuffs including snacks and sweets, more particularly to a combination weighing apparatus configured to supply the articles retained in a retaining hopper to flow downward to an article-incoming end of a transport path provided by a linear feeder or the like.

Patent documents 1 and 2 describe examples of combination weighing apparatuses equipped with retaining hoppers which are used to supply articles to be weighed. In the combination weighing apparatus described in patent document 1, the retaining hoppers are first turned over and then moved upward and downward. In the combination weighing apparatus described in patent document 2, the retaining hoppers (tanks in which articles to be weighed are storable) are coupled with and locked to the apparatus with a locking mechanism using locking pins or hooks such as draw latches, and the retaining hoppers are allowed to move when they are uncoupled from the apparatus.

CITATIONS LIST

Patent Document

Patent Document 1: Japanese Unexamined Patent Publication No. 2018-77074
Patent Document 2: Japanese Unexamined Patent Publication No. H09 (1997)-257554

SUMMARY OF INVENTION

Technical Problems

When articles to be weighed by a combination weighing apparatus are food, for example, snacks and/or sweets, structural elements of the apparatus that directly contact the food, for example, hoppers, may have to be frequently removed and cleaned in order to deal with hygienic issues and to remove allergic substances.

In the apparatus described in patent document 1, the retaining hoppers are first turned over and then moved upward and downward, which may entail an additional burden whenever the retaining hoppers are mounted to and dismounted from the apparatus. In the apparatus described in patent document 2, a single-touch operation may allow the retaining hoppers to be rather easily mounted to and dismounted from the apparatus. The retaining hoppers of this apparatus, however, have complicated bottom shapes that may be difficult to clean, and cleaning of the locking pins or hooks may be a time-consuming labor.

Another problem with the apparatuses described in these patent documents is that the mechanisms employed in these apparatuses to fixedly attach the retaining hoppers are composed of a number of members and are thus structurally complex, requiring high manufacturing costs.

The present invention was accomplished to address these issues of the known art and is directed to providing a combination weighing apparatus that is easily and inexpensively producible and that allows retaining hoppers to be readily mounted to and dismounted from the apparatus without using any particular tool for cleaning and other purposes.

Technical Solutions

To this end, the present invention provides the following technical features.

1) A combination weighing apparatus according to the present invention includes: a retaining hopper that retains an article and supplies the article retained onto a transport path; and support rails disposed in a pair. The combination weighing apparatus is further characterized in that the retaining hopper has a coupling portion adapted to be inserted in along the support rails and pulled off from the support rails, and the retaining hopper is supported by the support rails by having the coupling portion inserted in and coupled to the support rails.

According to the present invention, the retaining hopper may be easily mountable to and dismountable from the apparatus by simply having the coupling portion inserted in along the support rails and pulled off from the support rails.

2) According to a preferred embodiment of the present invention, the coupling portion may be a flange formed at an upper end of the retaining hopper, and the retaining hopper may be supportably suspended from the support rails by having the flange inserted in and coupled to the support rails.

According to this embodiment, the retaining hopper may be supportably suspended from the support rails by having the flange at an upper end of the retaining hopper inserted in and coupled to the support rails so as to slide along the support rails. The retaining hopper simply structured with the flange alone may be easily handled for cleaning and other purposes.

3) The combination weighing apparatus according to another embodiment of the present invention may be characterized in that the support rails are equipped with: a first stopper on a rear-end side in a direction of the retaining hopper being inserted; and a second stopper on a front-end side in the direction of the retaining hopper being inserted, and the first stopper is adapted to contact and restrict the retaining hopper from moving in the direction of the retaining hopper being inserted after the retaining hopper is inserted to a certain position, and the second stopper is adapted to contact and restrict the retaining hopper from moving in a direction of the retaining hopper being pulled off after the retaining hopper is inserted to a certain position.

According to this embodiment, the retaining hopper thus supported under its own weight by the support rails may be not easily movable in either one of the directions in which the retaining hopper is inserted and pulled off, Thus, the retaining hopper, simply through contact with the first and second stoppers at the rear and front sides in the direction of insertion, may be surely immovable from and kept at a certain mounting position.

4) The combination weighing apparatus according to yet another embodiment of the present invention may be characterized in that the flange is formed at an outer peripheral position of a rectangular throw-in port of the retaining hopper, the flange is formed along the directions of the retaining hopper being inserted and pulled off and is inserted in and engageable with the support rails, an end of the flange on a side in the direction of the retaining hopper being inserted is allowed to contact the first stopper, and an end of the flange on another side in the direction of the retaining hopper being pulled off is allowed to contact the second stopper.

According to this embodiment, the flange formed at an outer peripheral position of the rectangular throw-in port may impart an improved rigidity to the coupling portion of the retaining hopper. The retaining hopper may be accordingly supported with higher strength by the support rails.

By inviting the first and second stoppers to contact the ends of the flange in both of the directions of the retaining hopper being inserted and pulled off, the retaining hopper may be correctly located and kept at a predetermined mounting position.

5) The combination weighing apparatus according to yet another embodiment of the present invention may be characterized in that the support rails are disposed at a lower end part of a retaining tank located in an upper direction of the retaining hopper.

According to this embodiment, the retaining hopper is supportably suspended from the support rails disposed at a lower end part of the retaining tank located in the upper direction of the retaining hopper. By thus having the retaining hopper supported by the retaining tank, an additional member that supports the retaining hopper, for example, a frame, may be dispensable. This may structurally simplify the apparatus, eliminating a possible risk that such a frame interferes with a cleaning operation.

6) The combination weighing apparatus according to a preferred embodiment of the present invention may further include: a plurality of supply units that are linearly arranged next to each other, the plurality of supply units each including the retaining hopper and a linear feeder that receives the article supplied from the retaining hopper; and a plurality of weighing units that are linearly arranged next to each other; the plurality of weighing units each including a set of a supply hopper and a weighing hopper that are vertically disposed. The combination weighing apparatus may be further characterized in that the supply hopper retains the article supplied from the linear feeder of each of the supply units and discharges the article retained, and the weighing hopper retains the article discharged from the supply hopper and measures a weight of the article retained.

According to this embodiment, the weighing units each including the supply hopper and the weighing hopper that are vertically disposed are linearly arranged next to each other, and the linear feeders that supply the supply hoppers with articles are linearly arranged next to each other. When an operator wants to use a greater number of weighing units to supply the supply hoppers with a broader range of articles, for example, the linear feeders and the weighing units, which are respectively linearly arranged, may be simply increased in the directions of their linear arrangement. The combination weighing apparatus may accordingly have a relatively flat and compact structure.

Effects of the Invention

Thus, the present invention may successfully provide a combination weighing apparatus that is easily and inexpensively producible and that allows the retaining hoppers to be readily mounted to and dismounted from the apparatus without using any particular tool for cleaning and other purposes.

BRIEF DESCRIPTION OF THE DRAWINGS

FIG. 8B is a longitudinal side view of the different-spec linear feeder,

DESCRIPTION OF EMBODIMENTS

Embodiments of the present invention are hereinafter described in detail with reference to the accompanying drawings.

Figure 1:
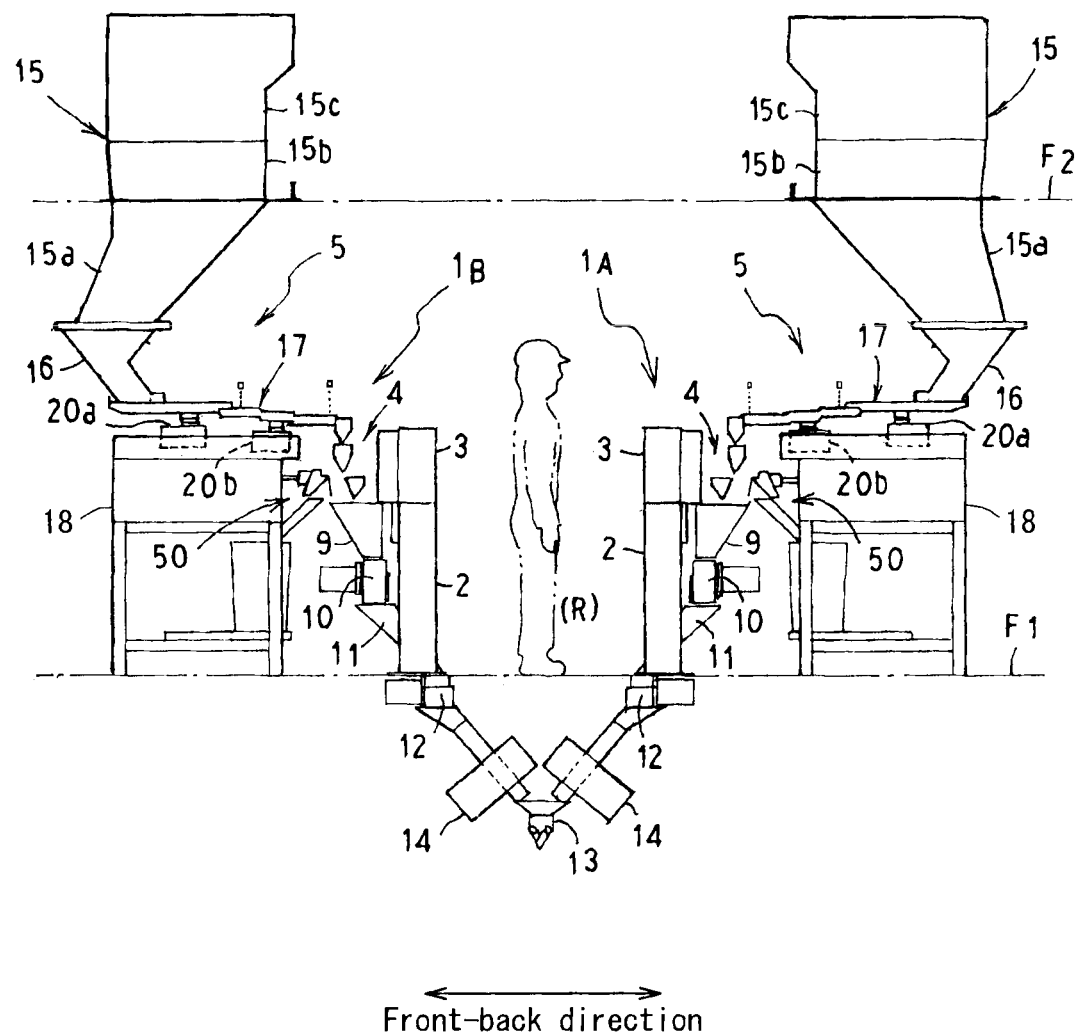
FIG. 1 is a schematic side view of a combination weighing apparatus according to an embodiment of the present invention.
Figure 2:
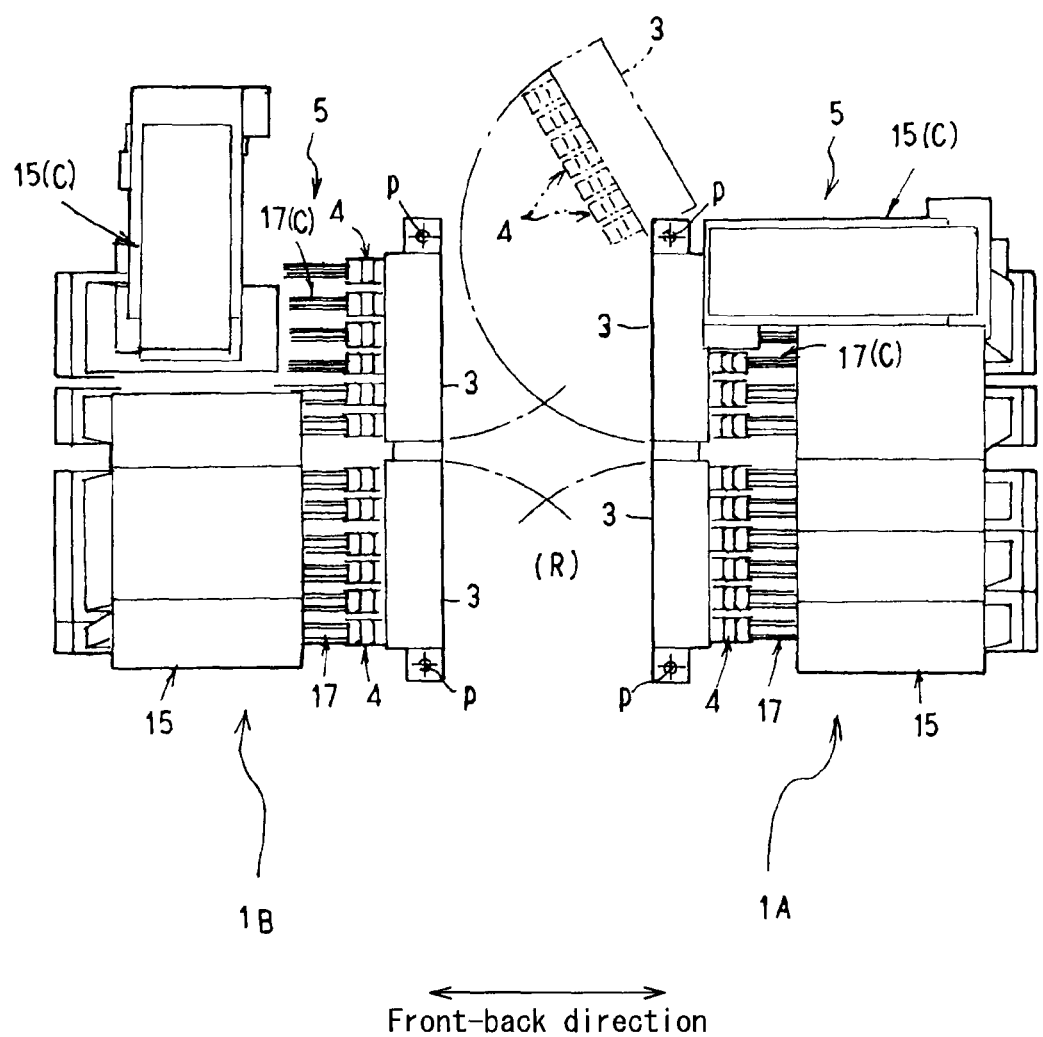
FIG. 2 is a schematic plan view of the combination weighing apparatus illustrated in FIG. 1.
Figure 3:
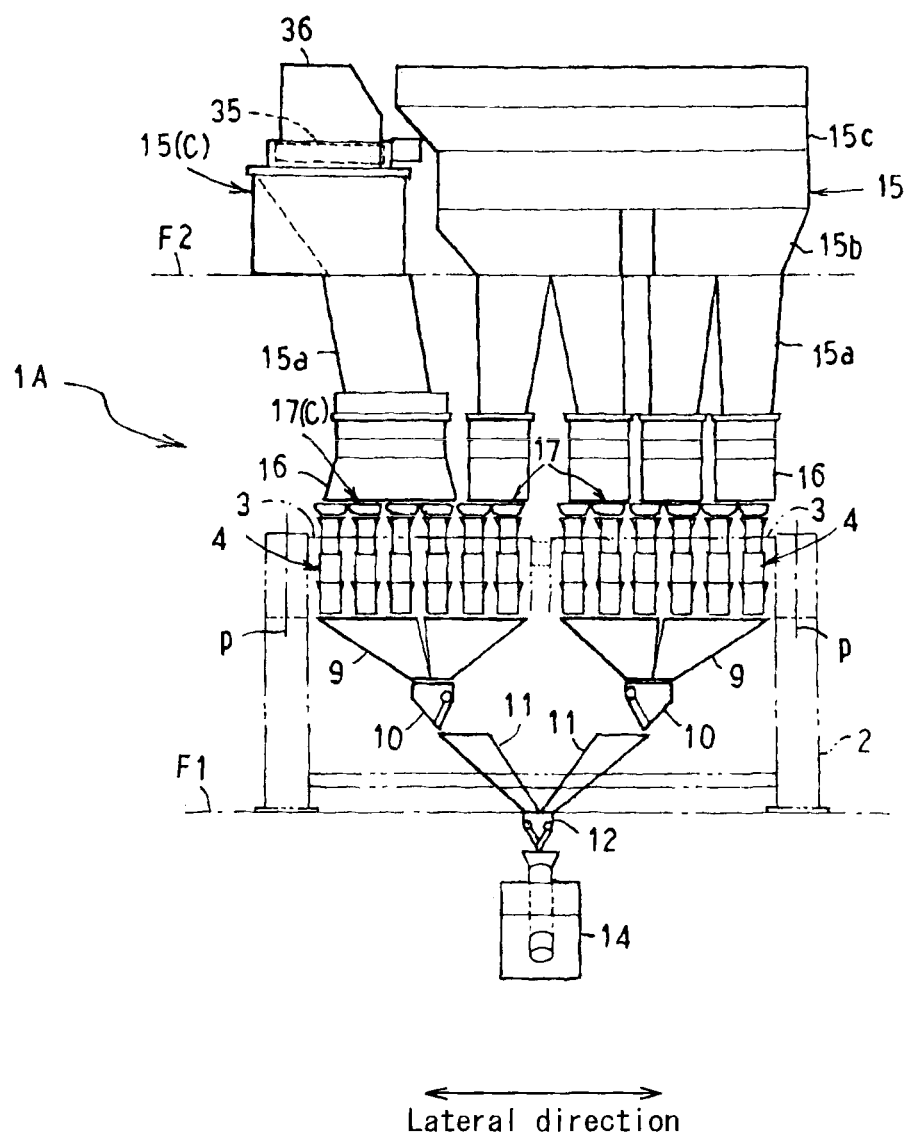
FIG. 3 is a schematic front view of one of weighing apparatuses illustrated in FIG. 1.
Figure 4:
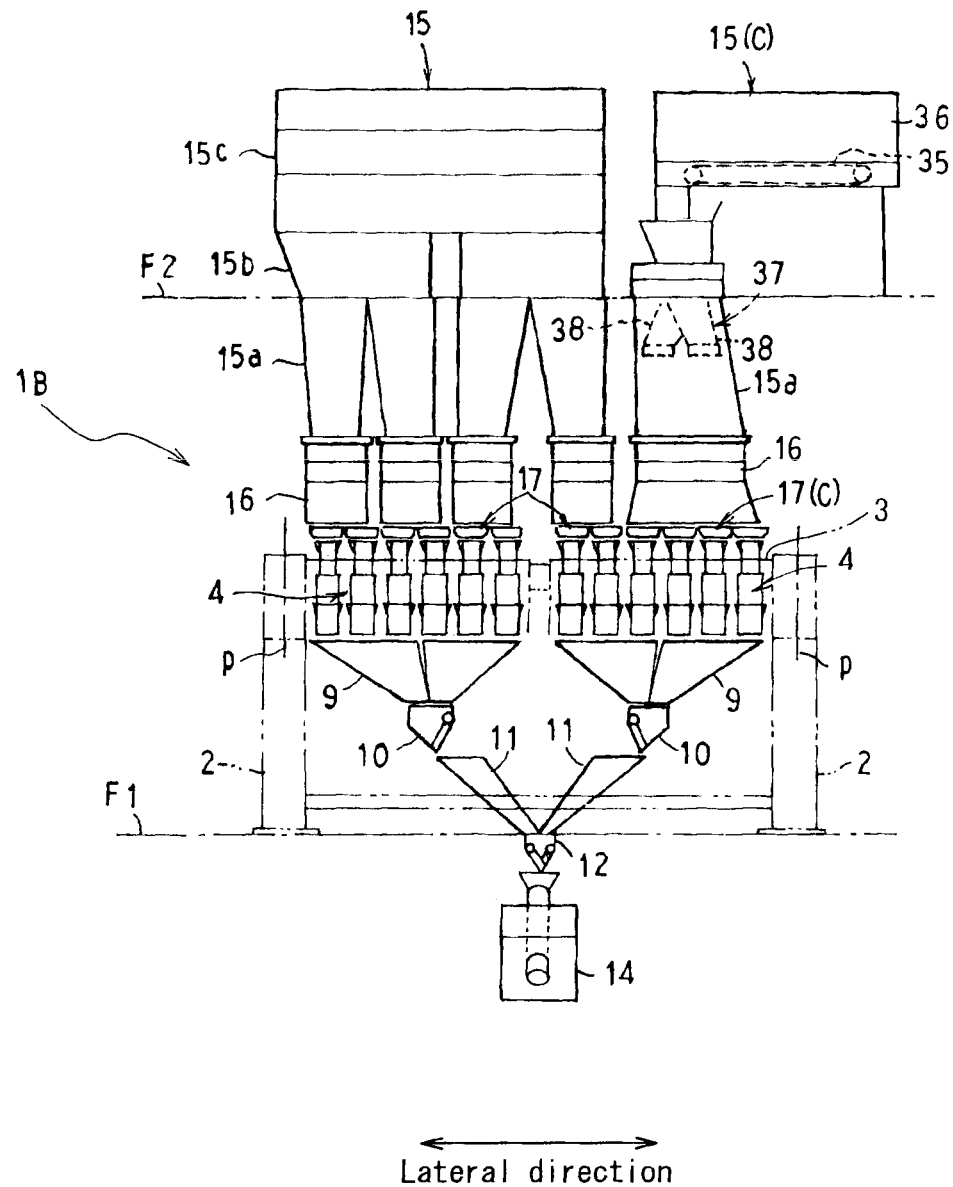
FIG. 4 is a schematic front view of the other weighing apparatus illustrated in FIG. 1.

FIG. 1 is a schematic side view of a combination weighing apparatus according to an embodiment of the present invention. FIG. 2 is a schematic plan view of the combination weighing apparatus. FIGS. 3 and 4 are schematic front views of weighing apparatuses.

The combination weighing apparatus according to this embodiment is for use in mixing and weighing predetermined quantities of articles that range in a wide variety (for example, eight kinds of articles) such as foodstuffs including snacks and sweets. More specifically, this combination weighing apparatus may be suitably used to mix and weigh, for example, snacks to go with alcohol drinks in which nuts, bean snacks and/or cubic rice crackers are mixed into pouches with one or two small fishes cooked in mirin.

This combination weighing apparatus is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combination weighing apparatus, a front-back direction is hereinafter used to refer to the transverse direction on the drawings of FIGS. 1 and 2, and the direction from the near to far side on the drawings of FIGS. 3 and 4. Further, a lateral direction is hereinafter used to refer to the direction from the near to far side on the drawing of FIG. 1, and the transverse direction on the drawings of FIGS. 3 and 4.

As illustrated in FIG. 1, the combination weighing apparatus includes a pair of weighing apparatuses 1A and 1B. These weighing apparatuses 1A and 1B are disposed on the front and back sides in a manner that they face each other, with a central passage R being interposed therebetween. An operator of these weighing apparatuses is allowed to move laterally, from right to left and vice versa, through this central passage R. The weighing apparatuses 1A and 1B are essentially configured likewise, structural features of which are hereinafter described.

On the inner sides of the weighing apparatuses 1A and 1B (on the sides of the central passage R), two bases 3 are each disposed on a support frame 2 vertically disposed on the first floor surface F1 and thereby stands to a predetermined height. The bases 3 are disposed so as to extend in the lateral direction. On the outer sides of the bases 3 (on the sides opposite to the central passage R), multiple weighing units 4 are disposed in a row in the lateral direction. In the illustrated example, the weighing apparatuses 1A and 1B are each equipped with 12 weighing units 4 that are lined up in a row. A wide variety of articles may be successfully mixed and weighed with these 24 weighing units 4, in total, of the weighing apparatuses 1A and 1B.

An article supplier 5 is disposed on the outer side of the weighing units 4. The article supplier 5 supplies various kinds of articles to be weighed to positions above the weighing units 4.

Figure 5:
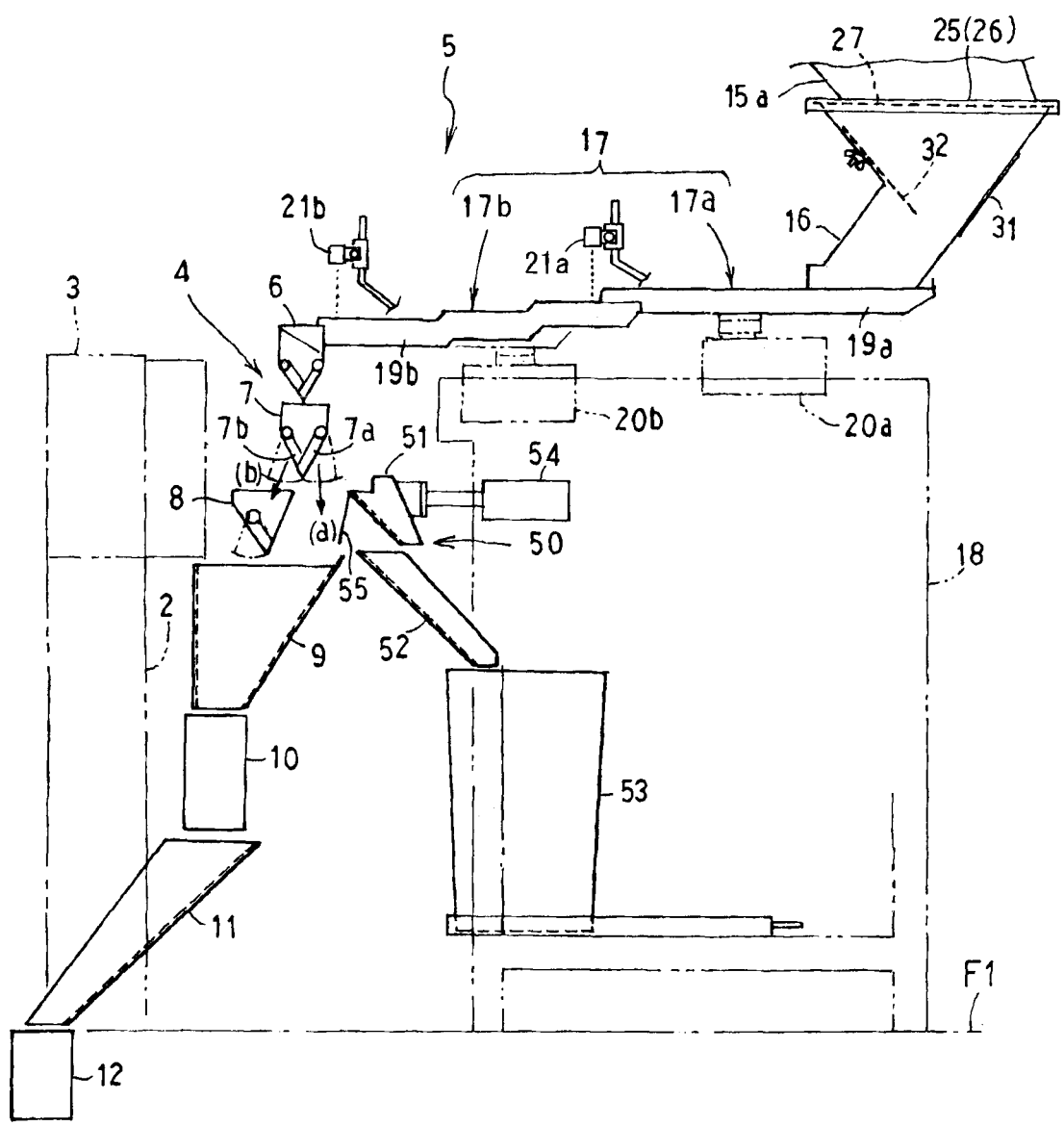
FIG. 5 is a side view of principal components of the weighing apparatus.
Figure 6:
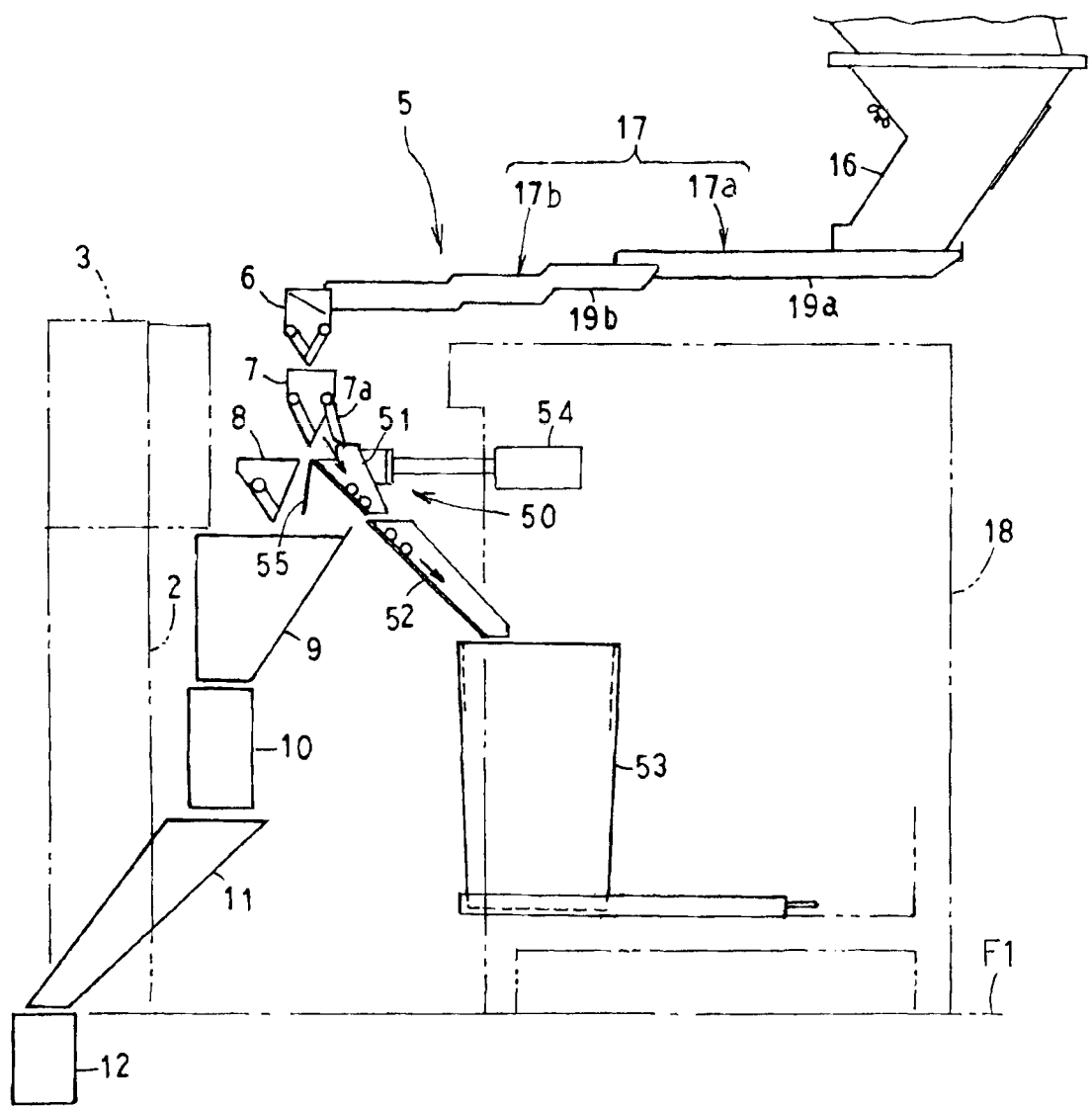
FIG. 6 is a side view of principal components of the weighing apparatus during a REJECT status.

As illustrated in FIG. 5, the weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3. In the base 3 are housed such devices as a mechanism to open and close the gates of these hoppers and a weight sensor used to measure the weights of the weighing hoppers 6.

As illustrated with a virtual line in FIG. 2, the bases 3 are supported in upper parts of the support frame 2 in a manner that these bases are pivotable around fulcrums p vertically extending at lateral ends. When the base 3 is pivoted toward the central passage R to have the weighing units 4 exposed to a large extent, the hoppers and other components may be easily attached and detached to and from the base 3 for maintenance and other purposes.

As illustrated in FIG. 5, the weighing hopper 7 has, at its lower end, an outer gate 7a and an inner gate 7b that are adapted to independently open and close. When the outer gate 7a alone is oscillated to open, the weighed articles are discharged directly into a first collection chute 9 disposed below through a first outgoing path (a). When the inner gate 7b alone is oscillated to open, the weighed articles are discharged into the memory hopper 8 through a second outgoing path (b) and temporarily retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Two second collection chutes 11 are disposed at positions below the first collection gates 10. These second collection chutes 11 guide and collect the articles dropping downward from the first collection gates 10. In a respective one of the weighing apparatuses 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing apparatuses 1A and 1B. This final collection hopper 13 is opened and closed in response to a supply request instruction outputted from the packaging apparatus. A metal detector 14 is disposed in a guiding path through which the articles are dropping downward from the second collection hopper 12 into the final collection hopper 13. The metal detector 14 monitors whether the articles are contaminated with any metallic foreign matter.

The article supplier 5 has retaining tanks 15 in which the articles are retainable, and retaining hoppers 16 continuous to lower ends of the retaining tanks 15. The article supplier 5 further has 12 linear feeders 17; an example of the article suppliers described herein. The linear feeders 17 are disposed next to each other in the lateral direction at positions above a support table 18. The linear feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b. The retaining hopper 16 is detachably and supportably coupled to a lower end of the lower-stage tank 15a as described later.

As illustrated in FIG. 5, the linear feeder 17 includes two linear feeders; an upstream linear feeder 17a, and a downstream linear feeder 17, which are respectively disposed on upstream and downstream sides in the direction of transport of articles. The upstream linear feeder 17a and the downstream linear feeder 17b are disposed in tandem, with the upstream linear feeder being located at an upper position than the downstream one, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18. The troughs 19a and 19b are detachably coupled to vibration heads of the vibrating mechanisms 20a and 20b.

The articles thrown out of the retaining hopper 16 into the upstream linear feeder 17a are vibrationally transported into the downstream linear feeder 17b. Then, the articles are thrown, in a small quantity at a time, out of the article-outgoing end of the downstream linear feeder 17b into the supply hopper 6 of the weighing unit 4. Article sensors 21a and 21b are disposed at positions above the linear feeder 17. These article sensors 21a and 21b may detect, using, for example, laser, heights of the articles piled up at the article-incoming end and the article-outgoing end of the downstream linear feeder 17b. The vibrating mechanisms 20a and 20b are driven to generate vibration based on information of article detection outputted from the article sensors 21a and 21b, so that the linear feeders 17 are each allowed to uniformly transport the articles.

Figure 10:
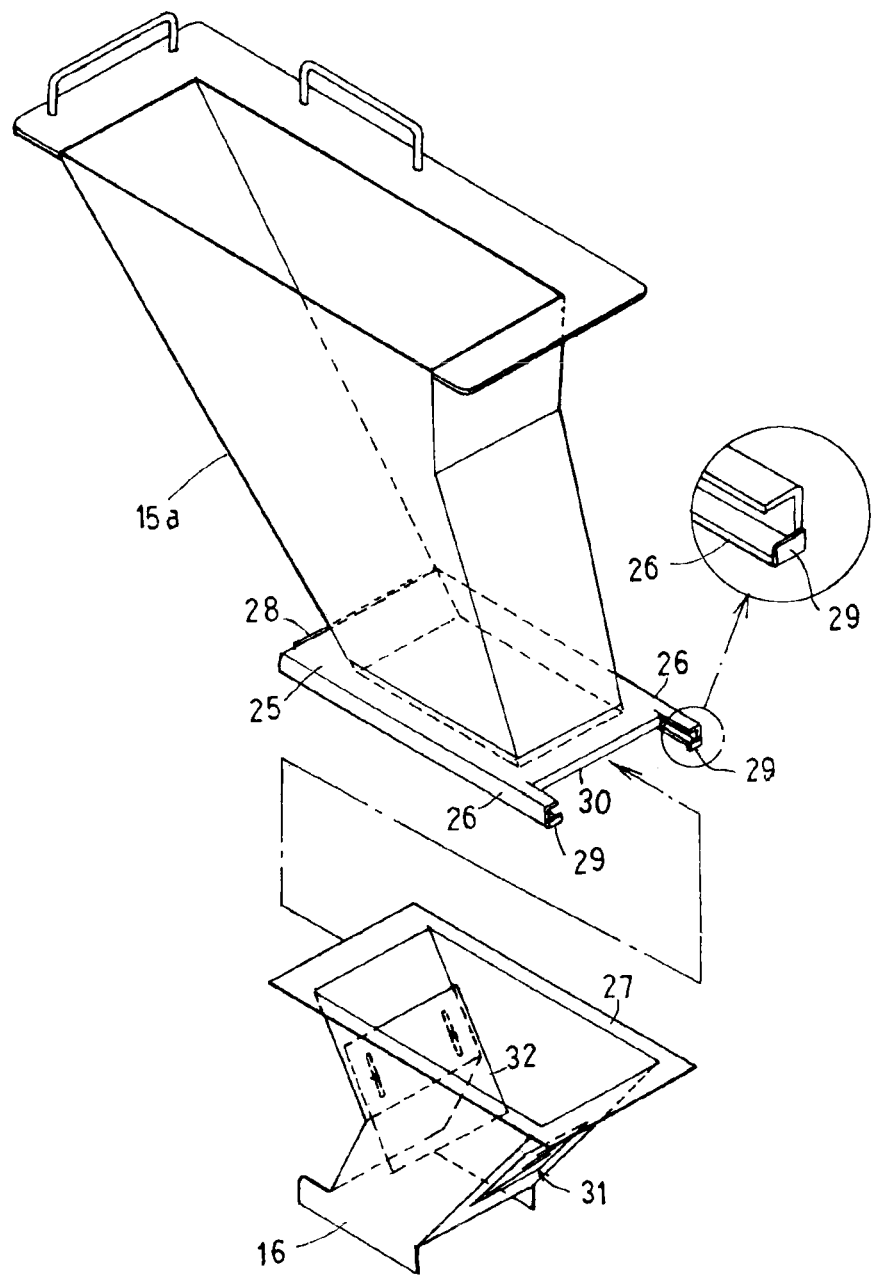
FIG. 10 is an exploded perspective view of a tank structure.

Next are described structural features that allow the retaining hopper 16 to be detachably and supportably coupled to a lower end of the lower-stage tank 15a among the retaining tanks 15. As illustrated in FIG. 10, the lower-stage tank 15a has, at its lower end, a hopper supporter 25 having a size slightly larger than an opening at the lower end of this tank. The hopper supporter 25 has a pair of support rails 26 on right and left sides. The support rails 26, bending inward so as to face each other, are formed with a predetermined interval therebetween.

A flange 27, serving as the coupling portion, is formed so as to extend from a rectangular throw-in port formed at an upper end of the retaining hopper 16. This flange 27 can be pushed and pulled, from the rear side (from the side opposite to the central passage R), in and out of the support rails 26 of the hopper supporter 25. A first stopper 28, horizontally long and bending upright, is formed at a position on the inner end side (on the side of the central passage R) of the hopper supporter 25 to receive the front end side of the inserted flange 27, Second stoppers 29, vertically small and bending upright, are formed at positions on the outer end side (on the side opposite to the central passage R) to receive the lateral rear ends of the inserted flange 27.

A hopper restrictor 30, bending downward, is formed on the outer side of the hopper supporter 25 to prevent the supported retaining hopper 16 from rising upward. An interval between a lower end of the hopper restrictor 30 and an upper end of the second stopper 29 has a dimension large enough to allow the flange 27 to pass through.

Figure 11A:
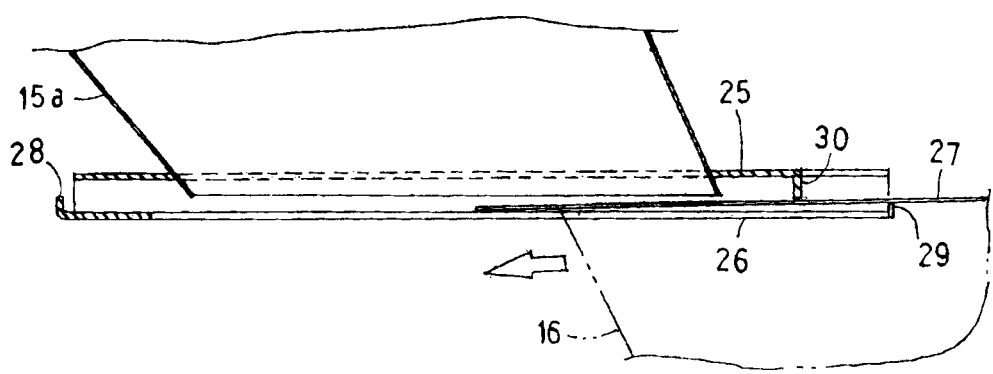
FIG. 11A is a side view illustrating steps of tank structure mounting steps.
Figure 11B:
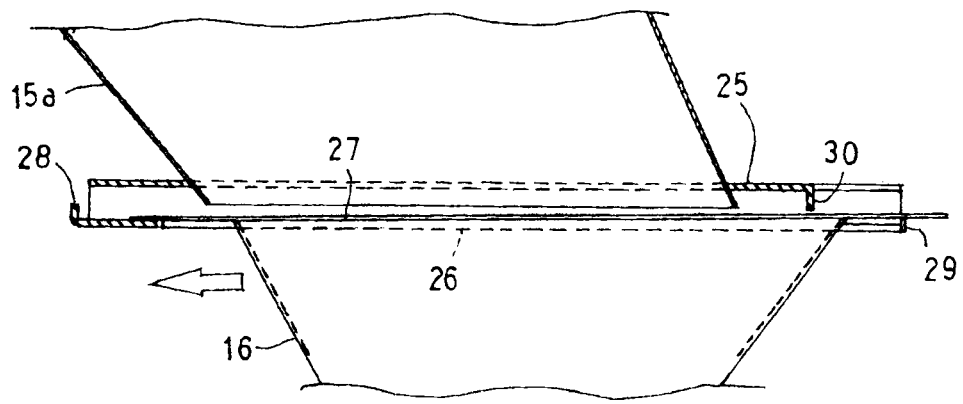
FIG. 11B is a side view illustrating tank structure mounting steps.
Figure 11C:
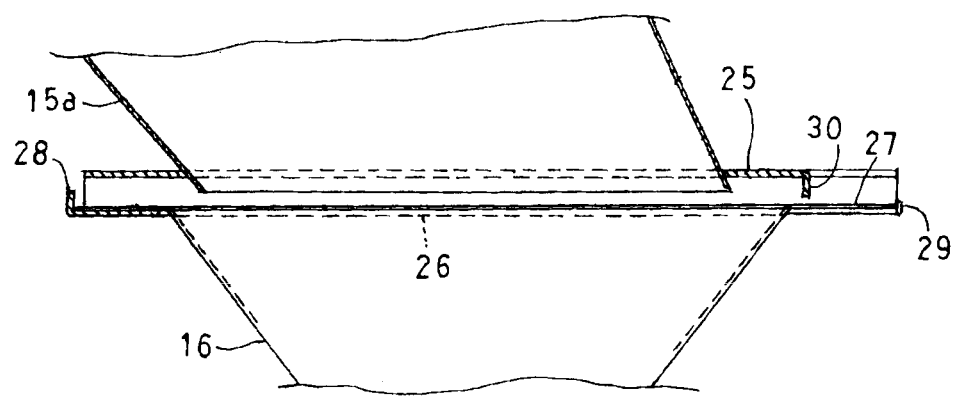
FIG. 11C is a side view illustrating tank structure mounting steps.

In order to couple the retaining hopper 16 to the lower-stage tank 15a, as illustrated in FIGS. 11A to 11C, the retaining hopper 16 is inclined with the front side of its flange 27 being slightly directed downward, and the retaining hooper 16 thus inclined is located in proximity to the hopper supporter 25 and then inserted into the support rails 26 through the interval between the lower end of the hopper restrictor 30 and the upper end of the second stopper 29.

When the front end side of the flange 27 is butted against the first stopper 28, the retaining hopper 16 is prevented from advancing any further into the rails. At the time, the rear end side of the flange 27 has been moved forward to a position past the second stopper 29, The retaining hopper 16 is then put back to its horizontal position again, and right and left end sides of the flange 27 are pushed into the support rails 26. Thus, front and rear end sides of the flange 27 are set in position by the first stopper 28 and the second stopper 29 and are thereby immovable forward and backward. As a result, the retaining hopper 16 is located and supportably suspended in a manner that for-, back-, right-, and leftward movements are not allowed relative to the lower-stage tank 15a.

In order to remove the retaining hopper 16 supported by the support rails 26, a rear part of the retaining hopper 16 is slightly lifted upward, and the rear end side of the flange 27 is moved to an upper position than the second stopper 29, When the retaining hopper 16 is then pulled outward, the retaining hopper 16 is removable from the lower-stage tank 16a.

According to this embodiment, the retaining hopper 16 may be thus readily attachable and removable to and from the support rails 26 without using any tool. Further advantageously, the retaining hoper 16 simply structured with the flange 27 alone may be easily handleable during, for example, cleaning.

The retaining hopper 16 is supportably suspended from the lower-stage tank 15a, which makes it unnecessary to additionally provide a support member, like a frame, to support the retaining hopper 16. This may avoid the risk of interference of such a frame with the retaining hopper 16 when attached and detached to and from the tank.

As described earlier, the lower-stage tank 15a is fitted in and supported by the opening on the second floor surface F2. The mid-stage tank 15b is positioned to and supported by the lower-stage tank 15a, and the upper-stage tank 15c is positioned to and supported by the mid-stage tank 15b by having their convex and concave shapes fitted into each other, These tanks 15a to 15c may be readily attachable and removable without using any tool and thus easily handleable during, for example, cleaning.

As illustrated in FIGS. 5 and 10, the retaining hopper 16 has a monitoring window 31 on a side surface of a vertically intermediate part thereof. An operator is allowed to watch, through this monitoring window 31, whether the articles are being retained and how many articles are currently retained in the retaining hopper 16. The retaining hopper further has a sliding shutter 32 at a vertically intermediate part thereof. An opening area at the lower end of the retaining hopper 16 may be adjustable by controlling the sliding shutter 32. The articles may be guided to flow downward at an opening degree of the sliding shutter 32 suitably set for the type of articles being transported. The retaining hopper 16, when its lower end is completely closed, is removable with the articles still remaining therein.

The tanks and feeders described thus far may be standard-spec components used to supply articles that hardly stick together like nuts, bean snacks, and cubic rice crackers. Some linear feeders 17 used to transport, in a small quantity at a time, sticky articles like small rice crackers or small fishes cooked in mirin, and retaining tanks 15 used with such linear feeders are configured differently to the standard-spec ones. In the example described below, of the 12 linear feeders 17 arranged next to one another in the lateral direction, four linear feeders 17(C) on one end side in the lateral direction and a retaining tank 15(C) disposed correspondingly to these feeders are configured according to a specification that differs from the standard specification, as illustrated in FIGS. 2 to 4. This structural feature is hereinafter described.

The different-spec retaining tank 15(C) is provided with a belt conveyer 35 having a large width. This belt conveyer is used to transport articles, smooth downward flow of which may be difficult under their own weights. The belt conveyer 35 is so disposed that is horizontally pivotable along a lower part of an upper tank 36 having a rectangular cylindrical shape, as illustrated in FIGS. 3 and 4. By driving the belt conveyer 35 to rotate, the articles retained at the bottom of the upper tank 36 may be forced out of the tank and allowed to widely flow downward into the retaining hopper 16 through the lower-stage tank 15a.

In the illustrated example, the retaining tank 15(C) of the weighing apparatus 1A and the retaining tank 15(C) of the weighing apparatus 1B are differently situated and installed.

As for the retaining tank 15(C) of the weighing apparatus 1A, the belt conveyer 35 is rotated in the front-back direction parallel to the direction of transport of articles by the linear feeders 17. As for the retaining tank 15(C) of the weighing apparatus 1B, the belt conveyer 35 is rotated in the lateral direction orthogonal to the direction of transport of articles by the linear feeders 17.

The articles dropped and discharged from the article-outgoing end of the belt conveyer 35 are guided into the retaining hopper 16 through the lower-stage tank 15a. As for the retaining tank 15(C) of the weighing apparatus 1B, the articles flowing out of the article-outgoing end of the belt conveyer 35 widely in the front-back direction are transported into the lower-stage tank 15a, as illustrated in FIG. 4. While the four linear feeders 17(C) are disposed in juxtaposition with one another in the lateral direction, the articles are transported out of the belt conveyer 35 widely in the front-back direction extending along the direction of width of the belt conveyer 35.

Supposing that the articles transported from the belt conveyer 35 for the retaining tank 15(C) of the weighing apparatus 1B are dropped immediately downward, two near-center ones of the four linear feeders 17(C) laterally arranged in juxtaposition may be abundantly supplied with the articles, whereas the linear feeders 17(C) on the right and left end sides may only receive fewer articles. The linear feeders 17(C) are supposed to supply a respective one of the supply hoppers 6 with the articles in a small quantity at a time. Yet, if the articles supplied from the belt conveyer 35 to the article-incoming ends of the linear feeders 17(C) are thus variable in quantity, the supply hoppers 6 may possibly be oversupplied with the articles or may not be supplied with the articles at all.

Thus, the articles transported by the belt conveyer 35 may possibly be supplied to an off-center position(s) in the lower-stage tank 15a. To prevent that, the weighing apparatus 1B has, in the lower-stage tank 15a, an article split-and-guide member 37 with a pair of split funnels 38. As illustrated in FIG. 4, the article split-and-guide member 37, using the paired split funnels 38, guide the articles discharged from the belt conveyer 35 to flow downward and disperse in the lateral direction in which the four linear feeders 17(C) are arranged.

Figure 12:
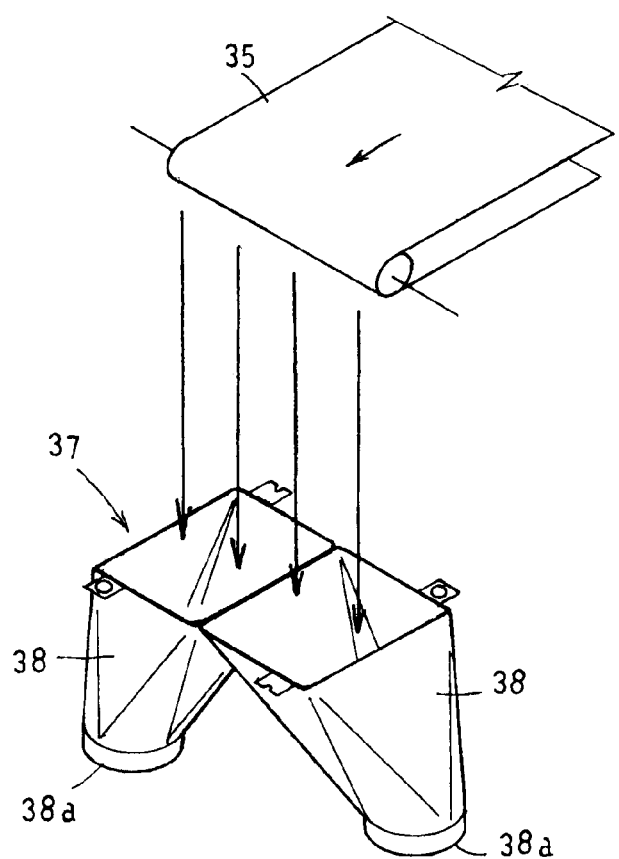
FIG. 12 is a schematic perspective view of a belt conveyer and an article split-and-guide member.
Figure 13:
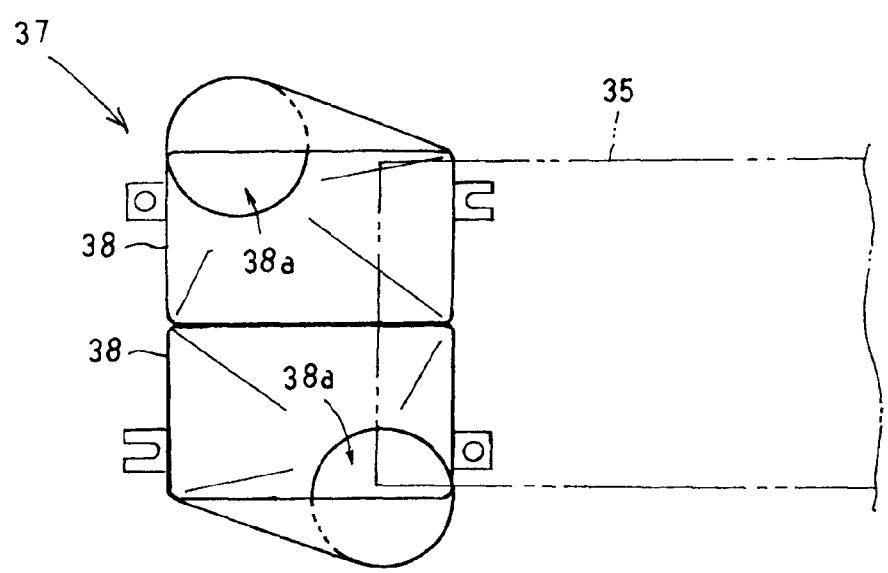
FIG. 13 is a schematic plan view of FIG. 12.

FIG. 12 is a schematic perspective view illustrating the belt conveyer 35 and the article split-and-guide member 37 of the weighing apparatus 1B. FIG. 13 is a schematic plan view of FIG. 12.

The two split funnels 38 are disposed in adjacency to each other along the direction of width of the belt conveyer 35 (front-back direction). The split funnels 38 are so disposed that a border between rectangular inlets at upper ends of these funnels 38 frills on the center of the belt conveyer 35 in the direction of its width.

The split funnels 38 respectively have circular outlets 38a at lower ends. The lower-end outlets 38a of the split funnels 38 are displaced relative to rectangular upper-end inlets of these funnels. The lower-end outlets 38a of the two split funnels 38 disposed in adjacency are distanced from each other in the lateral direction in which the four linear feeders 17(C) are arranged, i.e., in the direction of transport of the belt conveyer 35.

The articles, after being discharged from the article-outgoing end of the belt conveyer 35 and widely dropped to an upper part of the lower-stage tank 15a in the direction of belt width (front-back direction), are guided by the two split funnels 38 to flow downward and disperse in the lateral direction in which the linear feeders 17(C) are arranged. Thus, the articles may be allowed to disperse evenly or relatively evenly and thrown into the article-incoming ends of the four linear feeders 17(C).

Figure 7A:
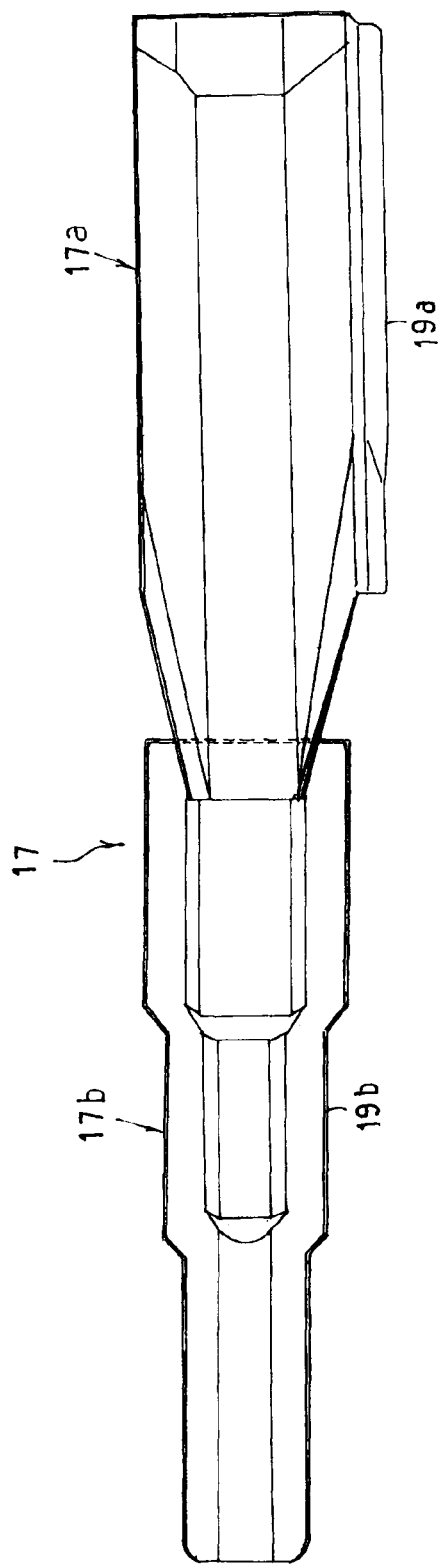
FIG. 7A is a plan view of a linear feeder produced according to a standard specification.
Figure 7B:
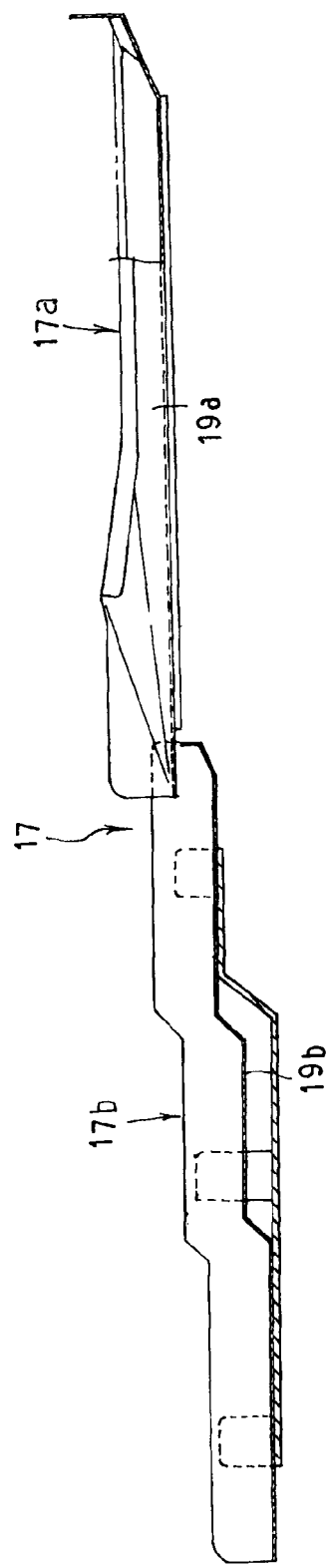
FIG. 7B is a longitudinal side view in part of the standard-spec linear feeder.
Figure 8A:
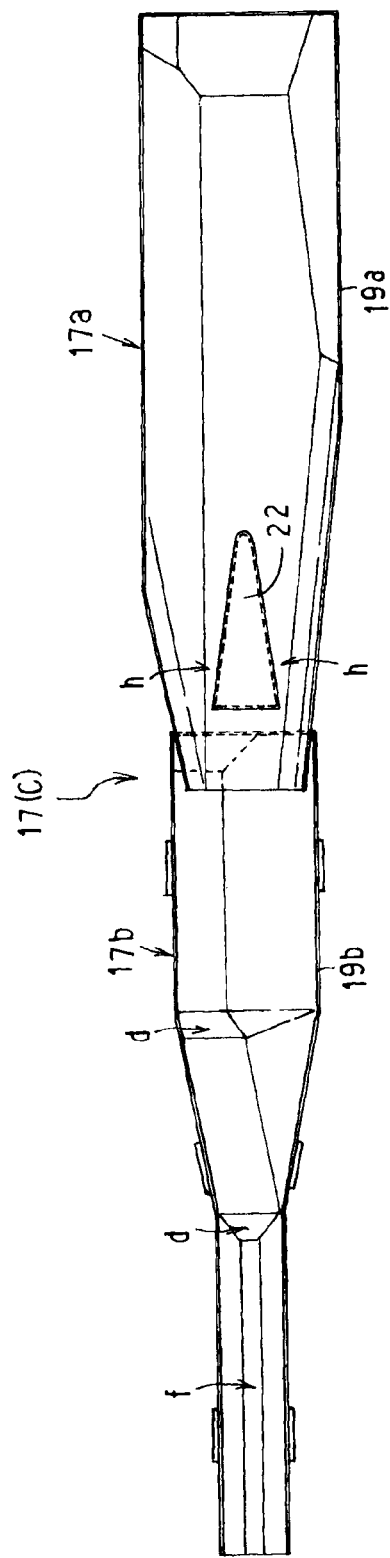
FIG. 8A is a plan view of a linear feeder produced according to a different specification.
Figure 9:
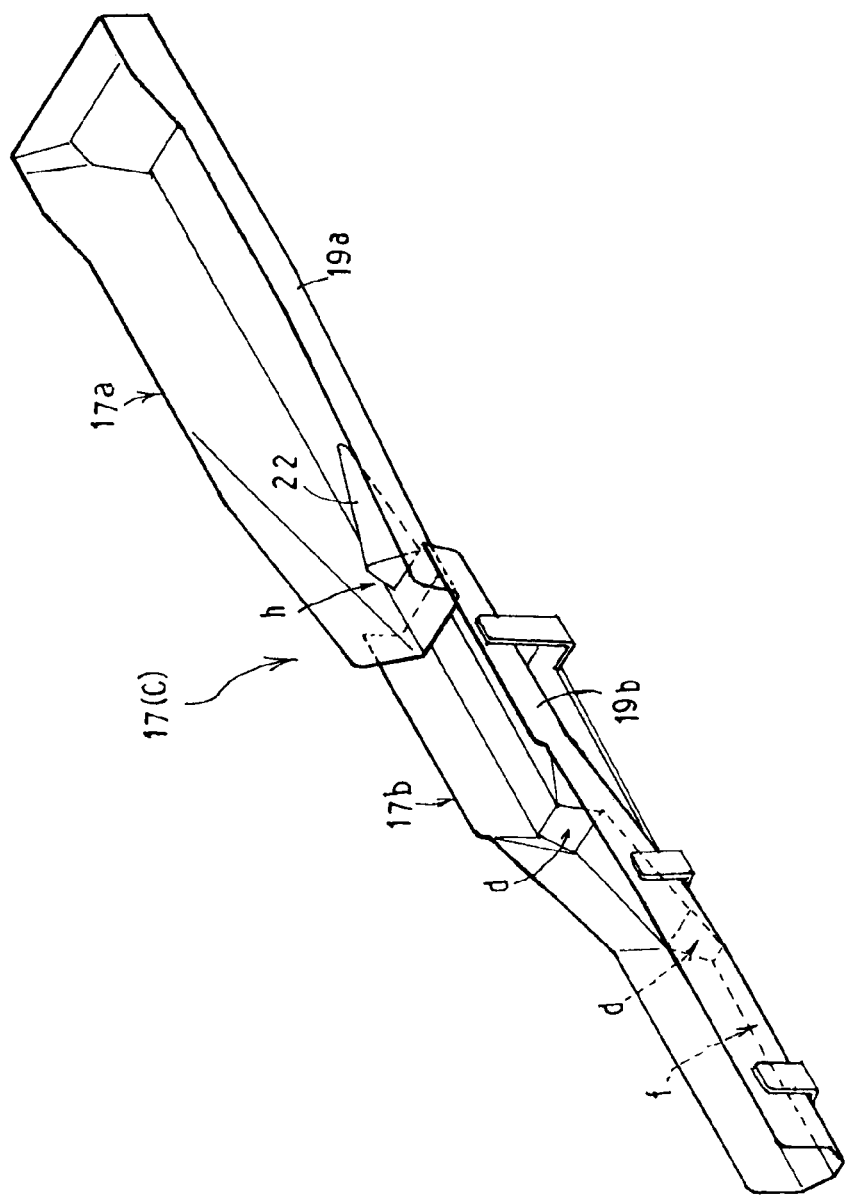
FIG. 9 is a perspective view of the different-spec linear feeder.

FIGS. 7(A) and 7(B) illustrate the standard-spec linear feeder 17, while FIGS. 8(A), 8(B) and 9 illustrate the different-spec linear feeder 17(C).

Description of structural details is hereinafter given to the different-spec linear feeder 17(C) that is suitable for use in transport of small quantities of sticky articles like small rice crackers or small fishes cooked in mirin.

The upstream linear feeder 17a of the different-spec linear feeder 17(C), which is illustrated in FIGS. 8(A), 8(B) and 9, has a trough 19a having a reversed trapezoidal shape in cross section, in this trough 19a, its bottom surface and side surfaces constituting the reversed trapezoidal shape form a transport path for the articles to be transported, in the transport path of this trough, a guiding protrusion 22 is formed at an intermediate position; a center position in this example, in the direction of width (lateral direction) relatively downstream in the direction of transport of articles. The guiding protrusion 22 serves to split and guide the articles being transported to lateral sides of the transport path in the direction of width.

The guiding protrusion 22 has a triangular shape in plan view elongated in the front-back direction and progressively greater in width in the direction of transport. The shape of this guiding protrusion 22 in side view is like a mountain linearly uprising by degrees in the direction of transport from the trough's bottom surface. The guiding protrusion 2 has, at a center position in the lateral direction, a ridge-like portion elongated in the front-back direction. The guiding protrusion 2 further has curved surfaces at sides in which the ridge-like portion is smoothly curved.

The guiding protrusion 22 provides, at its sides, transport passages "h" progressively narrower in the direction of transport. These transport passages "h" may preferably have, at the end of this guiding protrusion, a lateral width that allows two or three small fishes to pass through.

The downstream linear feeder 17b of the different-spec linear feeder 17(C) has a trough 19a having a reversed trapezoidal shape in cross section. This trough has a bottom surface bending like a stepwise slope directed downward in the direction of transport of articles. A transport passage "f" at the lowest level on the article-outgoing side of the trough 19b may have a small width only large enough to let through a row of articles, for example, a row of small fishes lined up with their heads or tails being directed forward.

The different-spec linear feeder 17(C) is configured to operate as described below. The articles supplied into and received by the upstream linear feeder 17a are vibrated and thereby transported forward. The articles being transported are then split by the guiding protrusion 22 to right and left and are thrown into the downstream linear feeder 17b. When, for example, the articles likely to stick together in a lump arrive at the guiding protrusion 22, the articles are guided to run over the guiding protrusion 22 and then vibrated and split onto two sides of this guiding protrusion. The articles may be thus split into smaller quantities and transported through narrow transport passages "h".

The articles transferred from the upstream linear feeder 17a into the downstream linear feeder 17b are subject to a certain drop impact due to a difference in height between these feeders 17a and 17b, which may allow the articles to easily split into pieces. The articles transported by the downstream linear feeder 17b drop through two differences in height "d" and may thereby easily split, and then arrive at a narrow, most downstream transport path "f". In this transport path "f", the articles may be lined up in a row and transported in a small quantity at a time, for example, one small fish at a time, into the supply hopper 6 of the weighing unit 4.

Thus, the guiding protrusion 22 formed in the trough 19a of the upstream linear feeder 17a may serve to split any articles likely to stick together in a lump, such as small fishes, onto two sides of the trough in the direction of width while the articles are being vibrationally transported. The articles, while travelling through the transport passages progressively narrower at sides of the guiding protrusion, may be thus split apart in small quantities at two sides of the trough in the direction of width and then transported in small quantities.

Under the drop impact generated at the time of the articles being transferred from the trough 19a of the upstream linear feeder 17a into the trough 19b of the downstream linear feeder 17b, any articles likely to stick together in a lump may be successfully split apart and smoothly transported. Thus, the articles may be successfully transported in a very small quantity at a time, even one each of small fishes at a time, out of the trough 19h of the downstream linear feeder 17b into the supply hopper 6 of the weighing unit 4.

As illustrated in FIG. 5, the support table 18 of the article supplier 5 has a reject mechanism 50 disposed to discharge the articles oversupplied into and received by the weighing hopper 6.

The reject mechanism 50 includes a reject chute 51 allowed to horizontally move forward and backward, and a collection chute 52 and a collection container 53 used to collect the articles introduced into and received by the reject chute 51.

The reject chute 51 is disposed so as to face a first transport path (a) of the weighing hopper 7 from the outer front side. The reject chute 51 is driven by an air cylinder 54 to move toward and away from the first transport path (a). At normal times, the reject chute 51 retreats to and stays at a position on the outer side of the first transport path (a), as illustrated in FIG. 5. Thus, the reject chute 51 may be prevented at normal times from interfering with discharge of the articles into the first collection chute 9 after the outer gate 7a of the weighing hopper 7 is opened.

In case a weight value measured by the weighing hopper 7 suggests an oversupply of the articles which is inappropriate for the combinatorial computations, the reject chute 51 moves to and stays on the first transport path (a), which is REJECT status. When the outer gate 7a of the weighing hopper 7 is opened during the REJECT status, the articles in excess in the weighing hopper 7 are discharged into the reject chute 51 and dropped downward into the collection container 53 through the collection chute 52. After the articles are thus collected, the reject chute 51 moves to the original position away from the first transport path (a), and the weighing hopper 7, with the outer gate 7a being closed, is ready for the next combinatorial computations.

The reject chute 51 has, at its edge, a guide member 55 made of a plate material. The guide member 55 is at a position facing the first transport path (a) from the outer side when the reject chute 51 is retreated to and staying at the position on the outer side of the first transport path. (a). At this position, the guide member 55 prevents the articles from flying off outward after being discharged from the weighing hopper 7 through the opened outer gate 7a, so that the articles are properly guided into the first collection chute 9.

OTHER EMBODIMENTS

The present invention may be feasible as described below.
1) The flange 27 of the retaining hopper 17 may be formed at its right and left sides alone.
2) To determine the position of the retaining hopper 16 in the direction of insertion, the first stopper may be disposed so as to contact the outer side surface of the body of the retaining hopper 16 in the direction of insertion.

REFERENCE SIGNS LIST

15 retaining tank
15a lower-stage tank
16 retaining hopper
25 hopper supporter
26 support rail
27 flange
28 first stopper
29 second stopper
30 hopper restrictor

The invention claimed is:

1. A combination weighing apparatus, comprising:
a retaining hopper that retains an article and supplies the article retained onto a transport path; and
support rails disposed in a pair,
the retaining hopper comprising a coupling portion adapted to be inserted in along the support rails and pulled off from the support rails, the retaining hopper being supported by the support rails by having the coupling portion inserted in and coupled to the support rails.

2. The combination weighing apparatus according to claim 1, wherein
the coupling portion is a flange formed at an upper end of the retaining hopper, and
the retaining hopper is supportably suspended from the support rails by having the flange inserted in and coupled to the support rails.

3. The combination weighing apparatus according to claim 2, wherein
the support rails comprise:
a first stopper on a rear-end side in a direction of the retaining hopper being inserted, the first stopper being adapted to contact and restrict the retaining hopper from moving in the direction of the retaining hopper being inserted after the retaining hopper is inserted to a certain position; and
a second stopper on a front-end side in the direction of the retaining hopper being inserted, the second stopper being adapted to contact and restrict the retaining hopper from moving in a direction of the retaining hopper being pulled off after the retaining hopper is inserted to a certain position.

4. The combination weighing apparatus according to claim 3, wherein
the flange is formed at an outer peripheral position of a rectangular throw-in port of the retaining hopper,
the flange formed is formed along the directions of the retaining hopper being inserted and pulled off and is inserted in and engageable with the support rails,
an end of the flange on a side in the direction of the retaining hopper being inserted is allowed to contact the first stopper, and
an end of the flange on another side in the direction of the retaining hopper being pulled off is allowed to contact the second stopper.

5. The combination weighing apparatus according to one of claims 1 to 4, wherein
the support rails are disposed at a lower end part of a retaining tank located in an upper direction of the retaining hopper.

6. The combination weighing apparatus according to one of claims 1 to 4, further comprising:
a plurality of supply units that are linearly arranged next to each other, the plurality of supply units each comprising the retaining hopper and a linear feeder that receives the article supplied from the retaining hopper; and
a plurality of weighing units that are linearly arranged next to each other, the plurality of weighing units each comprising a set of a supply hopper and a weighing hopper that are vertically disposed, wherein
the supply hopper retains the article supplied from the linear feeder of each of the supply units and discharges the article retained, and
the weighing hopper retains the article discharged from the supply hopper and measures a weight of the article retained.

7. The combination weighing apparatus according to claim 5, further comprising:
a plurality of supply units that are linearly arranged next to each other, the plurality of supply units each comprising the retaining hopper and a linear feeder that receives the article supplied from the retaining hopper; and
a plurality of weighing units that are linearly arranged next to each other, the plurality of weighing units each comprising a set of a supply hopper and a weighing hopper that are vertically disposed, wherein
the supply hopper retains the article supplied from the linear feeder of each of the supply units and discharges the article retained, and
the weighing hopper retains the article discharged from the supply hopper and measures a weight of the article retained.

* * * * *